US011479328B2

(12) United States Patent
Brown et al.

(10) Patent No.: US 11,479,328 B2
(45) Date of Patent: Oct. 25, 2022

(54) INFLATION-BASED ANTIFOULING

(71) Applicant: United States of America as represented by the Secretary of the Navy, San Diego, CA (US)

(72) Inventors: Michael Hunter Brown, San Diego, CA (US); Nicholas Ray Caruso, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 333 days.

(21) Appl. No.: 16/748,598

(22) Filed: Jan. 21, 2020

(65) Prior Publication Data

US 2021/0221482 A1    Jul. 22, 2021

(51) Int. Cl.
*B63B 59/04* (2006.01)
*G02B 27/00* (2006.01)

(52) U.S. Cl.
CPC ........ *B63B 59/045* (2013.01); *G02B 27/0006* (2013.01)

(58) Field of Classification Search
CPC ....... B63B 59/045; B63B 59/04; B63B 59/06; G02B 27/0006; G02B 1/18
See application file for complete search history.

(56) References Cited

U.S. PATENT DOCUMENTS

| | | |
|---|---|---|
| 5,322,569 A | 6/1994 | Titus |
| 6,311,546 B1 | 11/2001 | Dickinson |
| 7,713,558 B2 | 5/2010 | Riquelme Salamanca |
| 9,562,163 B2 | 2/2017 | Lobe |
| 10,207,299 B2 | 2/2019 | Lopez |
| 10,401,876 B1 | 9/2019 | Coleman |
| 2006/0189686 A1 | 8/2006 | Martensson |
| 2014/0083931 A1 | 3/2014 | Chang |
| 2015/0116656 A1* | 4/2015 | Stevens .................... G02B 3/14 359/666 |
| 2016/0068240 A1 | 3/2016 | Swain |

* cited by examiner

*Primary Examiner* — Anthony D Wiest
(74) *Attorney, Agent, or Firm* — Naval Information Warfare Center, Pacific; Kyle Eppele; James Eric Anderson

(57) ABSTRACT

An inflation-based antifouling system and method that include an inflatable film configured to be disposed on a target clean surface; and an inflation device that inflates the inflatable film such that bio-fouling is removed from the target clean surface.

20 Claims, 2 Drawing Sheets

US 11,479,328 B2

INFLATION-BASED ANTIFOULING

FEDERALLY-SPONSORED RESEARCH AND DEVELOPMENT

The United States Government has ownership rights in this invention. Licensing inquiries may be directed to Office of Research and Technical Applications, Naval Information Warfare Systems Center, Pacific, Code 3600, San Diego, Calif., 92152; telephone (619)553-3001; email: ssc_pac_t2@navy.mil. Reference Navy Case No. 104,090.

BACKGROUND OF THE INVENTION

Field of the Invention

The present disclosure relates generally to maintenance of underwater objects and, more particularly, to preventing bio-foul growth on underwater objects.

Description of Related Art

Keeping marine life from growing on underwater objects, such as sensors or rudders, deployed in the water column is a difficult challenge. This marine life may be referred to as bio-fouling. Bio-fouling can prevent successful data acquisition from electronics such as sensors. It is also an irritant for both deployment and recovery.

Bio-fouling is one of the major sources of drag and excess fuel consumption for vessels of all shapes and sizes, as well as causing early failures for important sensors and components when submerged for extended periods of time.

Many alternate methods have been tried, such as exposure to ultraviolet light or poisonous anti-fouling coatings, however, these methods have many major drawbacks, as the UV lights require significant power and the coatings lose their effectiveness over time.

There is a need for a bio-fouling system that does not suffer from the shortcomings of prior methods.

SUMMARY OF THE INVENTION

Aspects of the present disclosure provide a system and method for inflation-based antifouling. In accordance with one embodiment of the present disclosure, a system for inflation-based antifouling is provided. The system comprises an inflatable film composed of flexible material and configured to be disposed on a target clean surface such that the inflatable film covers the target clean surface; and an inflation device configured to inject fluid between the inflatable film and the target clean surface in order to inflate the inflatable film such that bio-fouling is removed from the inflatable film that covers the target clean surface.

BRIEF DESCRIPTION OF THE DRAWINGS

The accompanying drawings, which are incorporated in and form a part of the specification, illustrate example embodiments and, together with the description, serve to explain the principles of the invention.

DETAILED DESCRIPTION

The system and method described herein use a fluid to inflate an inflatable film that is bio-fouled and mounted on a target clean surface. Through inflation, stress is caused on the bacteria mounted to said film, causing them to be broken off or seek to move elsewhere.

The present system and method use an inflatable film that may attach to a target clean surface via clamps or other attachment means. In one embodiment, air is supplied to the inflatable film by a pump that moves the air from an air bladder to the film, and the air slightly inflates the film on top of the target clean surface. When the air inflates the film, the film expands, the surface area of the film increases and bio-fouling is dislodged and broken apart. If the microorganisms are broken apart, then bio-fouling does not occur.

Figure 1A:
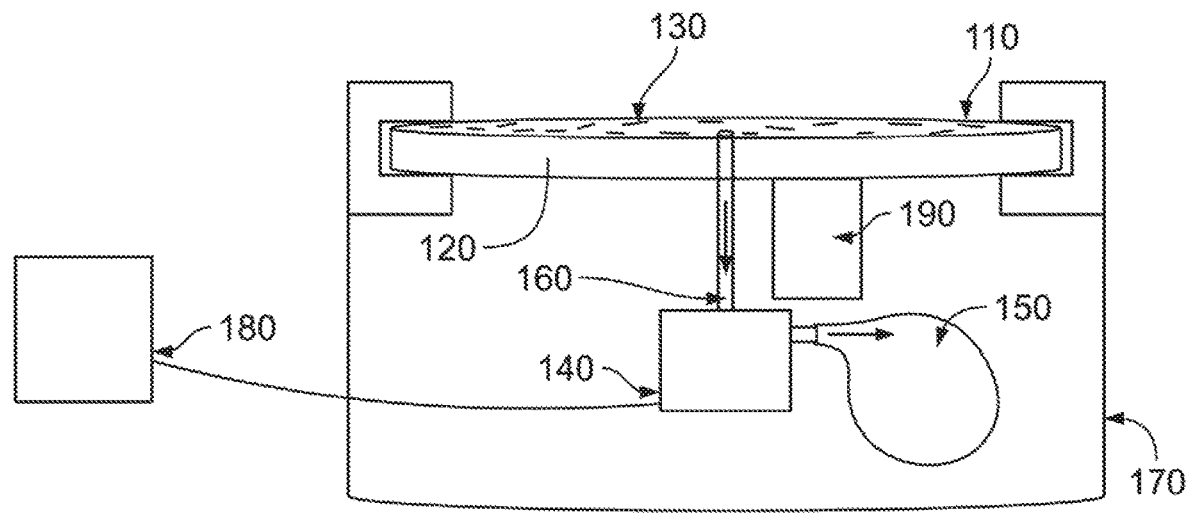
FIG. 1A illustrates a system for inflation-based antifouling with a full air bladder in accordance with aspects of the present disclosure.
Figure 1B:
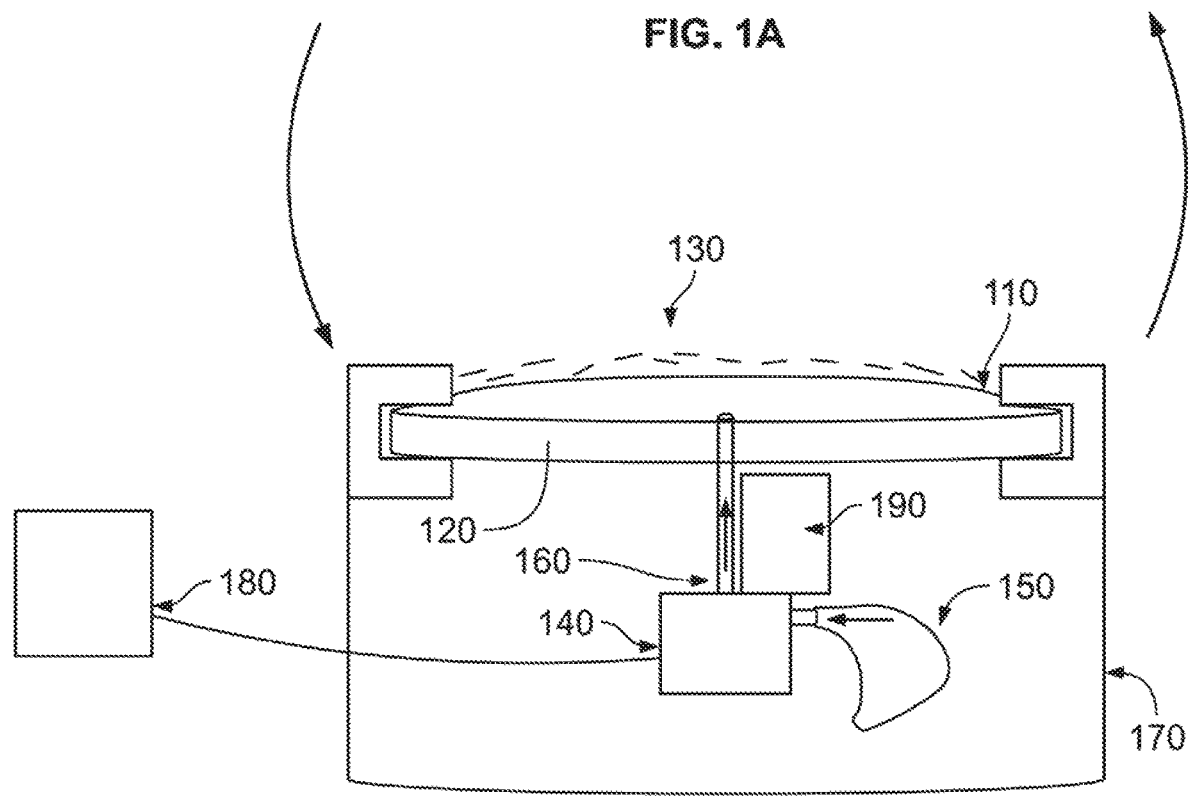
FIG. 1B illustrates a system for inflation-based antifouling with an empty air bladder in accordance with aspects of the present disclosure.

FIGS. 1A and 1B illustrate an embodiment of a system 100 for inflation-based antifouling with a full air bladder and empty bladder, respectively, in accordance with aspects of the present disclosure. The inflation-based antifouling system 100 includes an inflatable film 110 configured to be attached to a target clean surface 120. Inflatable film 110 may be composed of a flexible material, e.g., sturdy balloon material. Inflatable film 110 may also be clear or substantially translucent in order to permit an imaging instrument (such as a camera) or other object (not shown) to see through it. It may be desirable for the inflatable film 110 to be sufficiently flexible that, when inflated, a surface tension is created by the stretching of the inflatable film 110. It may also be possible for the bio-fouling to be dislodged when the inflatable film 110 is deflated. The thickness of inflatable film 110 may vary depending on the depth at which the inflation-based antifouling system is deployed and/or otherwise used. For example, at relatively shallow depths, inflatable film 110 may be composed of a material that is similar to a thick plastic wrap used for food storage. For greater depths, a thicker material may be desired.

In the present illustration (i.e., FIGS. 1A and 1B), target clean surface 120 is composed of glass. However, it should be understood that target clean surface 120 could also be composed of any other type of rigid surface, e.g., wood, metal or a plastic such as a polycarbonate. Target clean surface 120 may be clear or substantially transparent/translucent so as to allow light, whether sunlight, artificial light or other light to pass through. The amount of light that needs to pass through target clean surface 120 is dependent on the application. For example, for an application that involves an imaging instrument and where clear photographs are required, the amount of light that passes through would need to be sufficient to facilitate clear photos.

The inflatable film 110 inflates and deflates in order to break off attached bio-fouling 130. In one embodiment, inflation of the inflatable film 110 may occur when pump 140 moves fluid from the fluid bladder 150 to inflate the inflatable film 110 on top of the target clean surface 120. Examples of suitable fluids that may be used to inflate the inflatable film 110 include, but are not limited to, compressed air, hydrogen and liquids. In embodiments where a liquid such as water is used to inflate the inflatable film 110, then when the inflatable film 110 is deflated, the water may be released back into the ocean. Thus, the water is recycled. If air is used, the air could be recycled so that it enters an air storage tank (not shown), where it could be re-fed to the inflation-based antifouling system 100.

Fluid may be released from the pump 140 back to the fluid bladder 150. The pump 140 may be configured to release compressed or non-compressed air, another gas, or a liquid or any other fluid that can be used to inflate the fluid bladder 150. Fluid bladder 150 is configured to receive the fluid from the pump 140. When pump 140 removes fluid from fluid bladder 150, it may inflate the film 110 on top of target clean surface 120 in order to dislodge bio-fouling 130.

Fluid bladder 150 may be composed of rubber or other suitable material. A valve or solenoid (not shown) may be attached to the fluid bladder 150. When opened, the valve could cause fluid to flow to the fluid bladder 150.

Pump 140, fluid bladder 150 and fluid flow tube 160 may be contained in a watertight enclosure 170. The thickness of watertight enclosure 170 may vary depending on the depth at which the inflation-based antifouling system 100 is intended to operate. It may be desirable for the inflation-based antifouling system 100 to be pressure tolerant for the depth of water in which the inflation-based antifouling system 100 is expected to operate. For example, depending on the depth, the pressure at a certain level could be anywhere from four (4) pounds per square inch (psi) to four thousand (4000) psi. Target clean surface 120 may form one wall of the watertight enclosure 170 as shown in FIGS. 1A and 1B.

In the present illustrations, pump 140 is located inside the watertight enclosure 170. Pump 140 may be an air pump that supplies air via fluid flow tube 160 to inflatable film 110. Alternatively, pump 140 may be a water pump that supplies water or other liquid to watertight enclosure 170 to inflate the inflatable film 110. Pump 140 may have a power supply or source (not shown) such as a battery, a fuel cell, or a power source connected via an underwater cable (not shown).

An inflation controller 180 may be used to turn the pump 140 on and off. The controller 180 could be activated in a number of ways. For example, the inflation controller 180 can be automatically activated, tied to shore with a line that turns it on, or a diver could push a button manually. The inflation controller 180 can be located inside the watertight enclosure 170 or outside the watertight enclosure 170, the latter being shown in the drawings. It may be desirable for the inflation controller 180 to be inside the watertight enclosure 170 so that it can be protected from the underwater elements including bio-fouling.

In FIG. 1B, the bio-fouling 130 that was present in FIG. 1A has now been removed from the target clean surface 120. The bio-fouling 130 was removed when the film 110 was inflated on top of target clean surface 120. Target clean surface 120 can form the fourth wall of the watertight enclosure 170. O-rings or other sealing mechanisms (not shown) could be included at the edges of the target clean surface 120 in order to facilitate water-tightness.

Inflatable film 110 may be continuously inflated and deflated, or in order to save energy and other resources, the inflatable film 110 may be inflated when an inflation controller 180 such as a solenoid is used to initiate the inflation of the inflatable film 110 according to a predetermined schedule, e.g., fifty percent (50%) on and 50% off may be desirable. With testing, it would be possible to determine the optimum number of inflation-deflation cycles required to minimize fouling growth.

An imaging instrument 190, such as a digital camera, or other object such as a laser, may also be enclosed in the watertight enclosure 170. The amount of light that needs to pass through target clean surface 120 so that pertinent underwater object, e.g., imaging instrument 190, gets clear visuals may vary depending on the application for which the inflation-based antifouling system 100 is used. For example, an imaging instrument 190 may require more light than other applications. One of ordinary skill in the art would be able to understand the amount of light that needs to pass through the watertight enclosure 170 for clear visuals or otherwise.

With the present inflation-based antifouling system 100, no harmful chemicals or pollutants are used to prevent fouling. Thus, the present inflation-based antifouling system 100 is safer for the environment. The present inflation-based antifouling system 100 is energy efficient. For example, compressed air in the inflation-based antifouling system 100 may be recycled and reused. The air may move from the fluid bladder 150 to the area between the window and the inflatable film 110 and back. No external bottles of compressed air are required. Fouling prevention by the inflation-based antifouling system 100 could be used on optical surfaces such as clear glass windows/portholes. Nano-scale geometry could be imprinted into the film in order to increase nano-force gradients on microbes. One could use a compressed air canister and gradually bleed high pressure air using solenoids and timers rather than recycling to avoid the cost of using pump 140.

Figure 2:
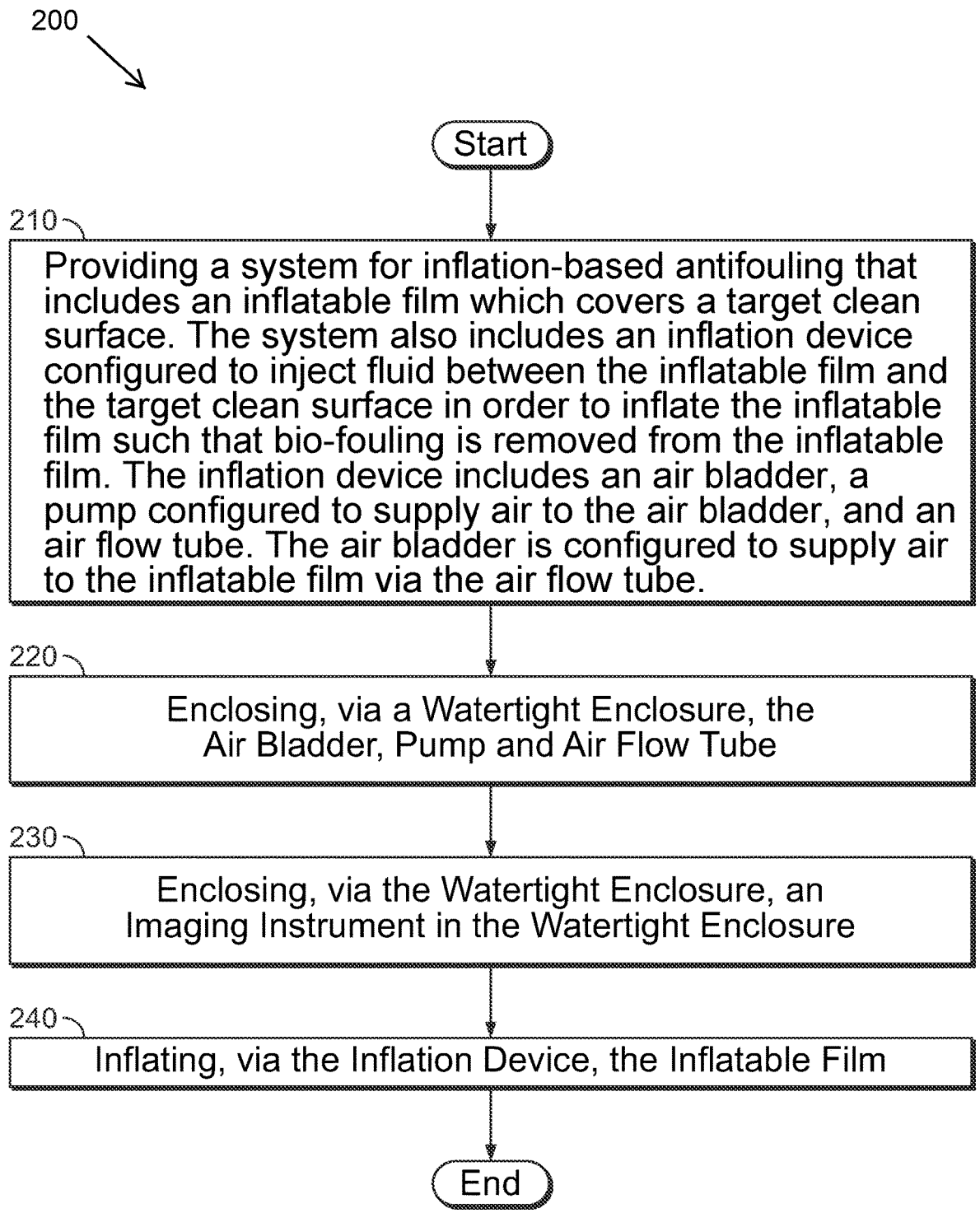
FIG. 2 illustrates a flow chart for a method for inflation-based antifouling in accordance with aspects of the present disclosure.

Referring now to FIG. 2, illustrated is a flow chart for a method for inflation-based antifouling in accordance with aspects of the present disclosure. At step 210, the method includes providing a system for inflation-based antifouling that includes: an inflatable film composed of flexible material and configured to be disposed on a target clean surface such that the inflatable film covers the target clean surface. In this embodiment of the method 200, the target clean surface is rigid. The inflation-based antifouling system also includes an inflation device configured to inject fluid between the inflatable film and the target clean surface in order to inflate the inflatable film such that bio-fouling is removed from the inflatable film that covers the target clean surface. The inflation device includes an air bladder, a pump configured to supply air to the air bladder, and an air flow tube. The air bladder is configured to supply air to the inflatable film via the air flow tube.

At step 220, the method includes enclosing, via a watertight enclosure, the air bladder, pump, and air flow tube. At step 230, the method includes enclosing, via the watertight enclosure, an imaging instrument in the watertight enclosure. At step 240, the method includes inflating, via the inflation device, the inflatable film.

The foregoing description of various embodiments have been presented for purposes of illustration and description. It is not intended to be exhaustive or to limit the system and method to the precise forms disclosed, and obviously many modifications and variations are possible in light of the above teaching. The example embodiments, as described above, were chosen and described in order to best explain the principles of the system and method and their practical application to thereby enable others skilled in the art to best utilize them in various embodiments and with various modifications as are suited to the particular use contemplated. It is intended that the scope of the invention be defined by the claims appended hereto.

What is claimed as new and desired to be protected by Letters Patent of the United States is:

1. An inflation-based antifouling system, comprising:
    an inflatable film composed of flexible material and configured to be disposed on a target clean surface such that the inflatable film covers the target clean surface, wherein the target clean surface is rigid; and
an inflation device configured to inject fluid between the inflatable film and the target clean surface in order to inflate the inflatable film such that bio-fouling is removed from the inflatable film that covers the target clean surface.

2. The system of claim 1, wherein the fluid is air and the inflation device includes:
an air bladder;
a pump configured to supply air to the air bladder; and
an air flow tube, wherein the air bladder is configured to supply air between the inflatable film and the target clean surface via the air flow tube.

3. The system of claim 2, further comprising:
a watertight enclosure configured to enclose the air bladder, pump, and air flow tube, wherein the target clean surface forms a wall of the watertight enclosure.

4. The system of claim 1, wherein the target clean surface is a substantially transparent window.

5. The system of claim 1, wherein the fluid is water, and wherein after the bio-fouling is removed from the inflatable film, the inflation device is configured to release into the ocean the fluid between the inflatable film and the target clean surface.

6. The system of claim 1, wherein nano-scale geometry designed to increase nano-force gradients on microbes is imprinted into the inflatable film.

7. The system of claim 6, wherein the inflation controller includes a solenoid that initiates an inflation of a space between the inflatable film and the target clean surface.

8. A method, comprising:
providing a system for inflation-based antifouling that includes:
an inflatable film composed of flexible material and configured to be disposed on a target clean surface such that the inflatable film covers the target clean surface, wherein the target clean surface is rigid; and
an inflation device configured to inject fluid between the inflatable film and the target clean surface in order to inflate the inflatable film such that bio-fouling is removed from the inflatable film that covers the target clean surface; and
inflating, via the inflation device, a space between the target clean surface and the inflatable film.

9. The method of claim 8, wherein the fluid is air and the inflation device includes:
an air bladder;
a pump configured to supply air to the air bladder; and
an air flow tube, wherein the air bladder is configured to supply air to the space between the target clean surface and the inflatable film via an air flow tube.

10. The method of claim 8, wherein the inflating step comprises bleeding high pressure air from a compressed air canister into the space between the target clean surface and the inflatable film and wherein the target clean surface is substantially transparent.

11. The method of claim 10, further comprising: deflating the space between the target clean surface and the inflatable film after the bio-fouling is removed by allowing air to escape from the space between the target clean surface and the inflatable film into an ambient environment.

12. The method of claim 11, further comprising:
enclosing, via the watertight enclosure, an imaging instrument in the watertight enclosure, wherein the target clean surface forms a wall of the watertight enclosure.

13. The method of claim 12, wherein the inflating step and the deflating step are serially performed periodically as controlled by an inflation controller.

14. The method of claim 13, wherein the inflation controller includes a solenoid that initiates an inflation of the space between the target clean surface and the inflatable film.

15. An inflation-based antifouling system, comprising:
an inflatable film composed of a flexible material and configured to be disposed on a target clean surface; and
an inflation device that includes an air bladder and a pump, wherein the pump is configured to pump air from the air bladder into a space between the target clean surface and the inflatable film such that the inflatable film stretches such that bio-fouling is removed from the inflatable film disposed on the target clean surface.

16. The system of claim 15, wherein the target clean surface and the inflatable film are substantially transparent.

17. The system of claim 15, further comprising:
a watertight enclosure configured to enclose the air bladder, and the pump.

18. The system of claim 15, further comprising:
an inflation controller configured to cause the inflation device to pump air into the space between the target clean surface and the inflatable film and to pump air out of the space between the target clean surface and the inflatable film after the bio-fouling has been removed from the inflatable film.

19. The system of claim 18, wherein the air that is pumped out of the space between the target clean surface and the inflatable film is returned to the air bladder.

20. The system of claim 18, wherein the inflation controller is further configured to release into an ocean environment air that is pumped out of the space between the target clean surface and the inflatable film.

* * * * *